(12) United States Patent
Beerse et al.

(10) Patent No.: US 8,892,652 B2
(45) Date of Patent: *Nov. 18, 2014

(54) E-MEETING SUMMARIES

(71) Applicant: International Business Machines Corporation, Armonk, NY (US)

(72) Inventors: Chelsea Christine Beerse, Fairport, NY (US); Patrick Joseph O'Sullivan, Ballsbridge (IE); Jeffrey B. Sloyer, Fishersville, VA (US); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,627

(22) Filed: Apr. 11, 2013

(65) Prior Publication Data

US 2013/0227025 A1   Aug. 29, 2013

Related U.S. Application Data

(63) Continuation of application No. 13/355,854, filed on Jan. 23, 2012.

(51) Int. Cl.
*G06F 15/16* (2006.01)
*H04L 29/06* (2006.01)
*G06Q 10/00* (2012.01)

(52) U.S. Cl.
CPC ............. *H04L 65/403* (2013.01); *G06Q 10/00* (2013.01)

USPC .......................................... 709/204; 709/206

(58) Field of Classification Search
None
See application file for complete search history.

(56) References Cited

U.S. PATENT DOCUMENTS

| 5,903,629 | A | 5/1999 | Campbell, IV et al. |
| 6,100,882 | A | 8/2000 | Sharman et al. |
| 7,689,712 | B2 | 3/2010 | Lee et al. |
| 7,756,923 | B2 * | 7/2010 | Caspi et al. .................. 709/204 |
| 8,434,001 | B2 * | 4/2013 | Kandekar et al. ............. 715/234 |
| 8,489,442 | B1 * | 7/2013 | Mohler ........................ 705/7.13 |

FOREIGN PATENT DOCUMENTS

| WO | 01/31463 A1 | 5/2001 |
| WO | 2005103954 A1 | 11/2005 |
| WO | 2005125201 A1 | 12/2005 |

\* cited by examiner

*Primary Examiner* — Jeffrey R Swearingen
(74) *Attorney, Agent, or Firm* — Holland & Knight LLP; Brian J. Colandreo, Esq.; Jeffrey T. Placker, Esq.

(57) ABSTRACT

A method, computer program product, and system for determining a custom summary of a web conference is described. A first input associated with a first portion of a web conference is received. A first content associated with the web conference is selected based upon, at least in part, the first input. A custom summary of the web conference is determined based upon, at least in part, the selected first content and a relation associated with a socially-connected group.

8 Claims, 5 Drawing Sheets

E-MEETING SUMMARIES

RELATED APPLICATIONS

The subject application is a continuation application of U.S. patent application with Ser. No. 13/355,854, filed on Jan. 23, 2012, the entire content of which is herein incorporated by reference.

TECHNICAL FIELD

This disclosure relates to electronic meetings.

BACKGROUND

The movement of meetings, presentations and other media to online fora has increased the availability of information to individuals and organizations. In order to best manage this wealth of information, it may be desirable to customize summaries of online meetings to accurately reflect the interests, duties and relationships of individuals consuming the summaries.

BRIEF SUMMARY OF THE DISCLOSURE

According to a first aspect of the disclosure, a computer-implemented method includes receiving, using one or more computing devices, a first input associated with a first portion of a web conference. The method further includes selecting, using one or more computing devices, a first content associated with the web conference based upon, at least in part, the first input. The method further includes determining, using one or more computing devices, a custom summary of the web conference based upon, at least in part, the selected first content and a relation associated with a socially-connected group.

One or more of the following features may be included. The method may include receiving, using one or more computing devices, a second input associated with a second portion of the web conference. The method may include selecting, using one or more computing devices, a second content associated with the web conference based upon, at least in part, the second input. The method may also include determining, using one or more computing devices, the custom summary of the web conference based upon, at least in part, the selected second content.

The first content may include at least one of a presentation material, text content and multimedia content associated with the presentation material. The first content may include at least a segment of multimedia content, and the custom summary may include at least an electronic file associated with the segment. The custom summary may include at least one of the first portion of the web conference and the first content. The relation may be determined, using one or more computing devices, based upon, at least in part, mining of social network information. The relation may be determined, using one or more computing devices, based upon, at least in part, comparing an attendee list with directory information. The relation may be determined, using one or more computing devices, based upon, at least in part, an external indicator. The first input may be associated with a first user and the second input may be associated with a second user.

According to another aspect of the disclosure, a computer program product resides on a computer readable storage medium and has a plurality of instructions stored on it. When executed by a processor, the instructions cause the processor to perform operations including receiving a first input associated with a first portion of a web conference. The operations further include selecting a first content associated with the web conference based upon, at least in part, the first input. The operations further include determining a custom summary of the web conference based upon, at least in part, the selected first content and a relation associated with a socially-connected group.

One or more of the following features may be included. The plurality of instructions, when executed by the processor, may further cause the processor to perform operations including receiving a second input associated with a second portion of the web conference, selecting a second content associated with the web conference based upon, at least in part, the second input, and determining the custom summary of the web conference based upon, at least in part, the selected second content.

The first content may include at least one of a presentation material, text content and multimedia content associated with the presentation material. The first content may include at least a segment of multimedia content, and the custom summary may include at least an electronic file associated with the segment. The custom summary may include at least one of the first portion of the web conference and the first content. The relation may be determined based upon, at least in part, mining of social network information. The relation may be determined based upon, at least in part, comparing an attendee list with directory information. The relation may be determined based upon, at least in part, an external indicator.

According to another aspect of the disclosure, a computing system includes at least one processor and at least one memory architecture coupled with the at least one processor. The computing system also includes a first software module executable by the at least one processor and the at least one memory architecture, wherein the first software module is configured to receive a first input associated with a first portion of a web conference. The computing system includes a second software module which is configured to select a second a first content associated with the web conference based upon, at least in part, the first input. The computing system also includes a third software module which is configured to determine a custom summary of the web conference based upon, at least in part, the selected first content and a relation associated with a socially-connected group.

One or more of the following features may be included. A fourth software module may be configured to receive a second input associated with a second portion of the web conference. A fifth software module may be configured to select a second content associated with the web conference based upon, at least in part, the second input. A sixth software module may be configured to determine the custom summary of the web conference based upon, at least in part, the selected second content.

The first content may include at least one of a presentation material, text content and multimedia content associated with the presentation material. The first content may include at least a segment of multimedia content, and the custom summary may include at least an electronic file associated with the segment. The custom summary may include at least one of the first portion of the web conference and the first content. The relation may be determined based upon, at least in part, mining of social network information. The relation may be determined based upon, at least in part, comparing an attendee list with directory information. The relation may be determined based upon, at least in part, an external indicator.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements

DETAILED DESCRIPTION OF THE PREFERRED EMBODIMENTS

Figure 1:
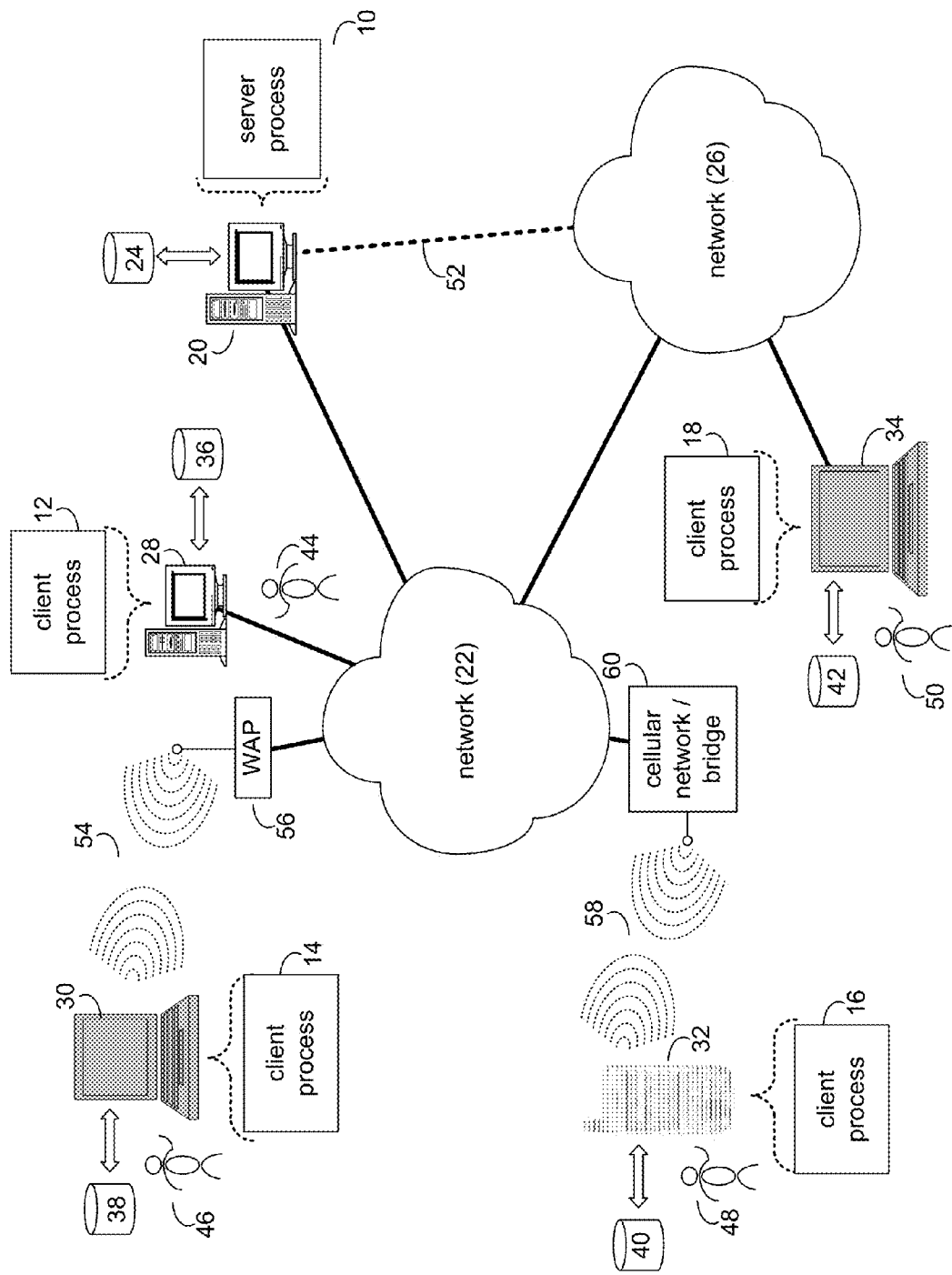
FIG. 1 is a diagrammatic view of a custom summary process coupled to a distributed computing network.
Figure 2:
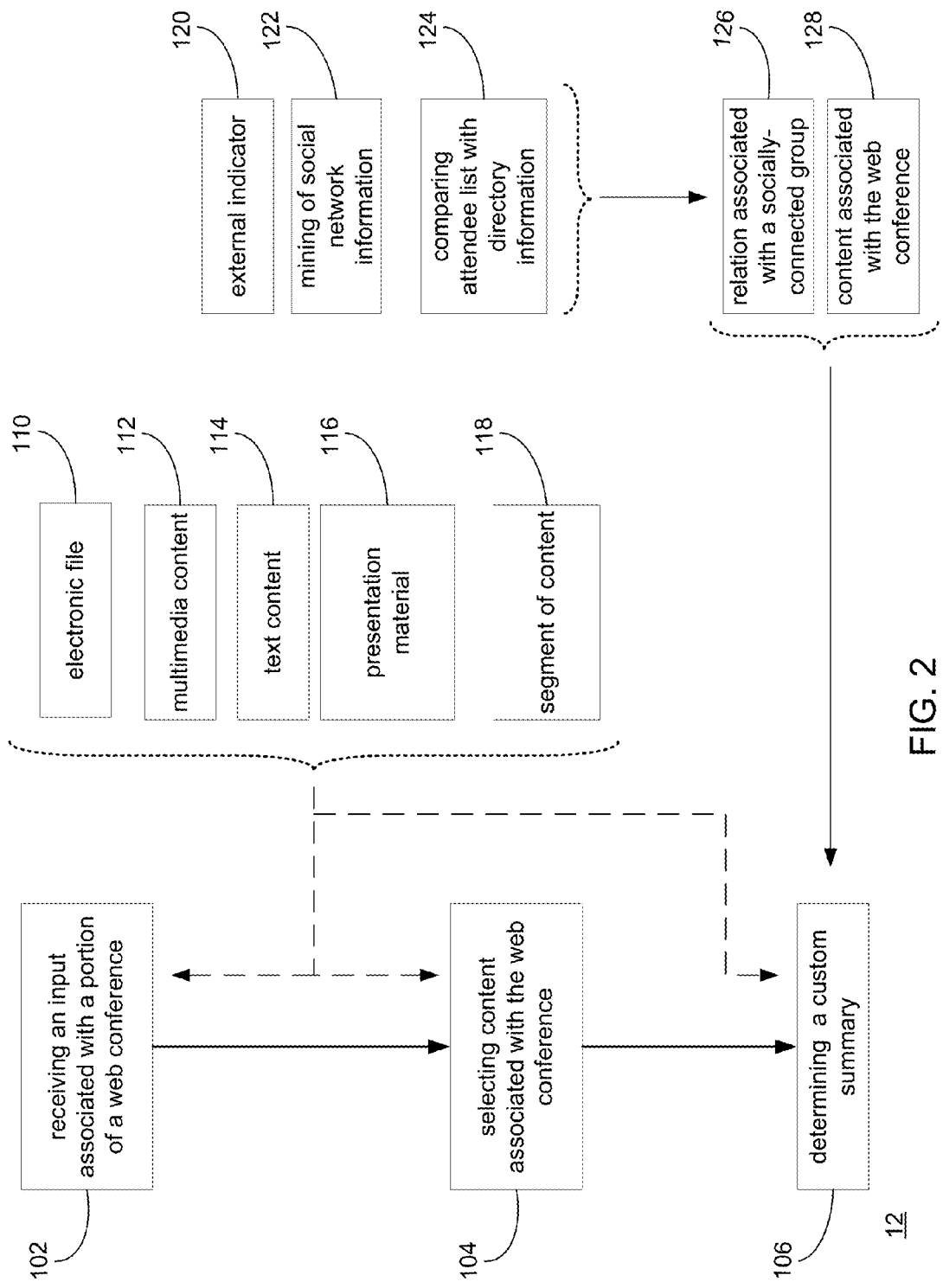
FIG. 2 is a flowchart view of a custom summary process.

Referring to FIGS. 1 & 2, there is shown a custom summary process (CSP), for example process 12. As will be discussed further below, process 12 may include receiving 102 an input associated with a portion of a web conference. The input may be associated with an electronic file 110, multimedia content 112, text content 114, presentation material 116, or a segment of content 118. The input may also be associated with one or more users (not shown). The first portion of content may include an electronic file 110, multimedia content 112, text content 114, presentation material 116, or a segment of content 118. Process 12 may further include selecting 104 content associated with the web conference. The selected content may include an electronic file 110, multimedia content 112, text content 114, presentation material 116, or a segment of content 118. Selecting 104 the content may be based upon, among other factors, the input or the portion of the web conference. Process 12 may further include determining 106 a custom summary of the web conference. The custom summary may include the portion associated with the web conference, content associated with the web conference 128, including, for example, the selected content, multimedia content 112, text content 114, presentation material 116, or a segment of content 118. Determining 106 the custom summary may be based upon the input, the portion of the web conference, the selected content, or a relation associated with a socially-connected group 126, wherein the socially-connected group may associated with the web conference. The relation associated with the socially-connected group 126 may be determined based upon, among other factors, external indicator 120, mining of social network information 122, or comparing an attendee list with directory information 124.

A CSP may be a server-side process (e.g., server process 10), a client-side process (e.g., client process 12, client process 14, client process 16, or client process 18), or a hybrid server/client process (e.g., the combination of server process 10 and one or more of client processes 12, 14, 16, 18).

Server process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server® Novell® Netware®; or Red Hat® Linux®, for example.

The instruction sets and subroutines of server process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

One or more of client processes 12, 14, 16, 18 and server-side process 10 may interface with each other (e.g., via network 22 and/or network 26).

Users 44, 46, 48, 50 may access server process 10 directly through the device on which the client process (e.g., client-side processes 12, 14, 16, 18) is executed, namely client electronic devices 28, 30, 32, 34, for example. Users 44, 46, 48, 50 may access server process 10 directly through network 22 and/or through secondary network 26. Further, server computer 20 (i.e., the computer that executes server process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

A Custom Summary Process (CSP)

For the following discussion, client-side CSP 12 will be described for illustrative purposes. It should be noted that client process 12 may be incorporated into server process 10 and may be executed within one or more applications that allow for communication with client process 12. However, this is not intended to be a limitation of this disclosure, as other configurations are possible (e.g., stand-alone client processes and/or stand-alone server processes.) For example, some implementations may include one or more of client processes 14, 16, 18 in place of or in addition to client process 12.

Many individuals and business find value in conducting various interactions electronically, whether in whole or in part, instead of in person. Such interactions, which include eMeetings, eLearning fora, webinars and other interactions, will be referred to generally, herein, as web conferences. Arranging for participants in a web conference to attend electronically—i.e., by way of audio or video connections—may lead to increased efficiency while reducing total costs associated with the meeting. Similarly, individuals may sometimes find greater convenience in attending web conferences via electronic means.

Certain web conferences may include a variety of content, of both primary and secondary form. Primary content may include multimedia content related to a presentation, lecture or discussion occurring as part of the web conference. For example, a web conference presentation may include video of a presenter, audio of speech, and electronic slides or handouts containing relevant content. Such materials may be available for access by streaming, download or other means. A web conference presentation may also include a variety of secondary content, or content which is associated with or related to primary content. For example, certain web conferences may permit participants, listeners, presenters, moderators, or others to submit comments, questions, or corrections as part of the web conference, whether in text or multimedia format. Such comments, questions or corrections may be associated with a particular portion of web conference content, including primary content. Such secondary content, while not necessarily containing information which is central to the presentation, may still be valuable to individuals or organizations. Secondary content may also be available for access by streaming, download or other means. Web conference content may also include various types of meta data associated with primary or secondary content, including, for example, the means of creating the associated content, the purpose of the content, the time and date of creation of the content, the author of the content, the location of a computer network of the content, copyright information relating to the content, and other information.

Figure 3:
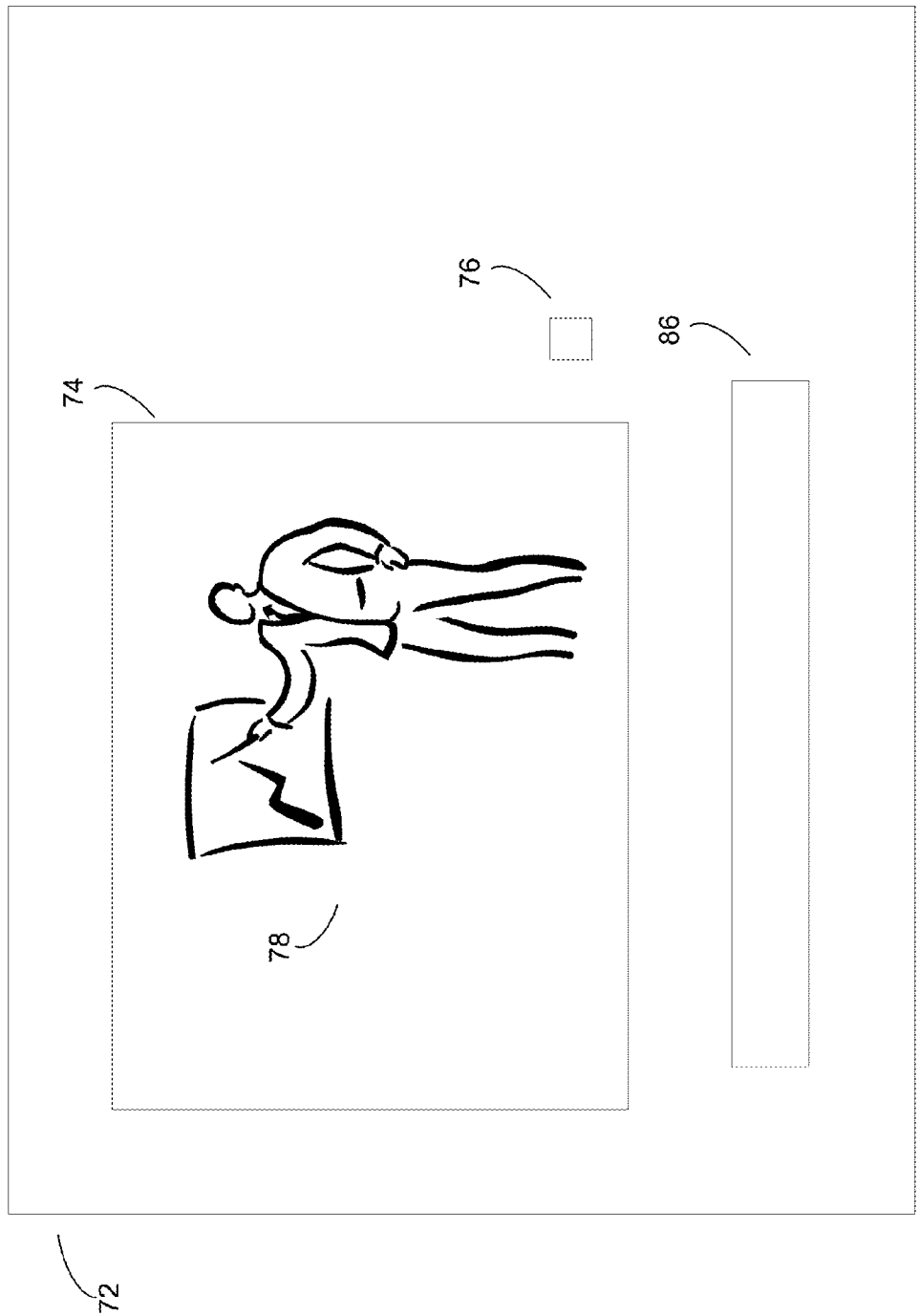
FIG. 3 is a first diagrammatic view of an implementation of a custom summary process.
Figure 4:
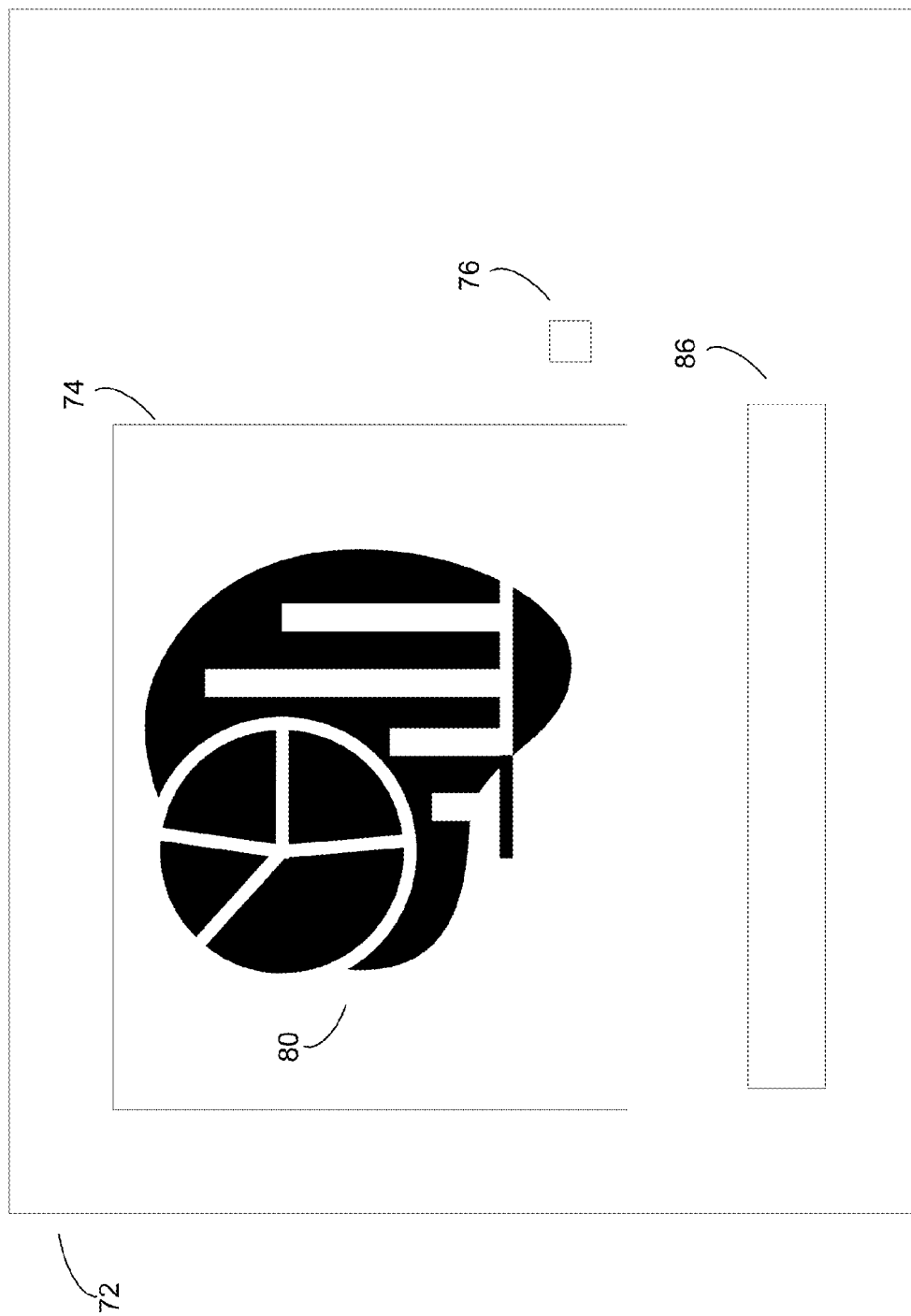
FIG. 4 is a second diagrammatic view of an implementation of a custom summary process.

Referring now also to FIGS. 3 and 4, process 12 relates to determining 106 a custom summary relating to a web conference. The process may include receiving 102 a first input associated with a first portion of a web conference. For example, while viewing or participating in a web conference using screen 72 of personal computer 28, a user may identify interesting, relevant or otherwise important portions of the web conference. These portions may include primary or secondary content or meta data and may include information or material visible in a presentation window 74, for example, video 78 of a speaker or presentation slide 80, as well as associated multimedia content (e.g., audio or video files), text content (e.g., comments, corrections, responses, handouts, or notes, including text content entered by users in comment box 86). It may be desirable, given the nature of the portion of the web conference (or associated content), for the user (or another) to have access to that particular portion (or associated content) at a later time.

Figure 5:
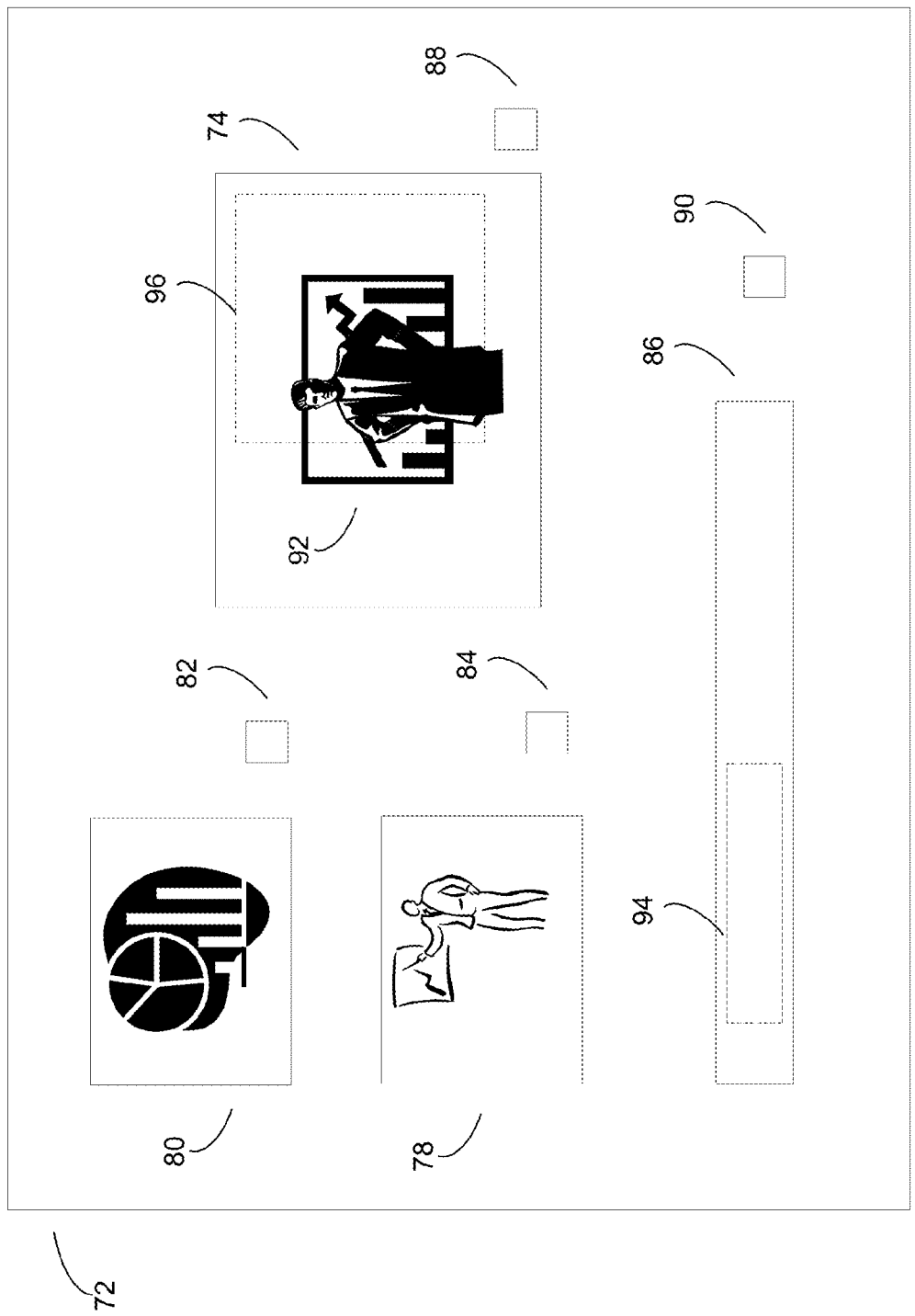
FIG. 5 is a third diagrammatic view of an implementation of a custom summary process.

In order to facilitate this later retrieval of information, a user may indicate his desire through a first input. This input may take a variety of forms. For example, a user may activate a check-box or button 76 on screen 72 indicating that the content currently visible is interesting content. In such an example, the first portion (e.g., video 78 or presentation slide 80) may be associated with the input of activating button 76 so long as the first portion of content is visible on screen 72. Referring now also to FIG. 5, as an alternative embodiment, screen 72 may show a variety of windows, including windows of previously presented content such as video 78 or presentation slide 80, current content window 74, and text content window 86. Buttons 82, 84, 88 and 90 may allow receipt of input associated with a variety of different content, including, respectively, a previously presented slide 80, a previously presented or viewed video 78, the current presentation material 92, or text content 90. Presentation material, as used herein, indicates an electronic slide or other content associated with information to be presented at a web conference.

In another embodiment, a second input may be received, associated with a second portion of the web conference. For example, while viewing or participating in a web conference using a separate screen (not shown) of a personal computing device (not shown), a second user may identify interesting, relevant or otherwise important portions (or associated content). These portions may include primary or secondary content or meta data and may include information or material visible in a presentation window, for example, video of a speaker or a presentation slide, as well as associated multimedia content (e.g., audio or video files), text content (e.g., comments, corrections, responses, handouts, or notes, including text content entered by users in a comment box). It may be desirable, given the nature of the content, for the second user (or another) to have access to that particular portion (or associated content) at a later time.

It will be understood that an input may be associated with a variety of portions, potentially including a variety of content, in a variety of ways. For example, an input button, e.g., button 88, may be associated with a segment of web conference content. In such a case, a user may indicate by activating button 88 the beginning and ending times of a segment of web conference content that is of interest. Such portion or segment may include multiple types of web conference content, including multimedia or text content, may include multiple electronic slides or files, and may also include partial electronic slides or files. Inclusion of partial electronic slides or files may occur when an input indicates that, for example, only a certain temporal or spatial portion of a video is of interest to a user. Similarly, advanced input mechanisms could allow a user to select a fraction of certain web conference content. This may occur, for example, through use of various means, including a mouse or another input device to indicate fraction 96 of an electronic slide or other file, or fraction 94 of text content, is interesting.

Process 12 may also include selecting 104 a first content associated with the web conference based upon, at least in part, the first input, or selecting 104 a second content associated with the web conference based upon, at least in part, the second input. The first (or second) content may include primary content, secondary content or meta data. In certain instances, the first content (or second content) may be precisely the content included in the first (or second) portion of the web conference. In such a case, the first (or second) content may include the first (or second) portion and, selecting the first (or second) content may occur simultaneously or near-simultaneously with receiving the first (or second) input. For example, if a user indicates interest in video 78 (i.e., the first portion) by using button 84, video 78 may be selected simultaneously as the first content, to be associated with and potentially included in the custom summary. In other cases, however, the first content may include additional content not included in the first portion of the web conference or may exclude the first portion. For example if the first input is associated with video 78, the first portion of content may include video 78. The first portion of content may also include, along with video 78 or in place of video 78, related text content (e.g., transcript of the video or comments from other users), related audio content (e.g., commentary of the video), or other related content (e.g., other slides associated with video 78, handouts or papers associated with video 78). The first content, as such, may include some, all, or none of the first portion of content as well as various combinations of other associated content. It will be understood that this description, and others throughout the disclosure, may apply equally to, for example, a first or second input, a first or second portion, and a first or second content. Similarly, this description and others throughout the disclosure may apply to determining any number of custom summaries.

Specific content may be selected as the first content in a variety of ways. For example, the first portion may include, based on the first input, a segment of multimedia content. This may occur, for example, when an input button, e.g., button 88, is associated with a segment of web conference content. In this case, a user may indicate by activating button 88 the beginning and ending times of a segment of web conference content that is of interest (including, potentially certain content in its entirety). As such, the segment of web conference content (e.g., a temporal period of a video or audio file), or some portion of it, may then be selected as the first content and associated with the custom summary along with other potentially related content, e.g. content related to similar subject matter. Specific content may also be selected based upon predetermined relationships among different content (e.g., an association between a video file and related other content). For example, it may be determined that various content is associated with presentation materials like an electronic slide, such as related multimedia content (e.g., audio description of the material represented by the slide), related meta data, or related comments or questions. Similarly, associations among various content may be determined through subject matter similarity or the selection of specific portions of a web conference by other users (e.g., a tendency of many users to select slide 12 when also selecting slide 14, 16 or 18). These and other like relationships may be a basis for selecting the first content or for determining the custom summary. For example, If the first input is associated with presentation material such as an electronic slide, it may be determined that the selected content or custom summary will include text comments and audio explanation associated with the electronic slide.

Process 12 may also include determining a custom summary of the web conference based upon, at least in part, the selected first content and a relation associated with a socially-connected group. For example, the custom summary may be determined to include the first portion, the selected first content or additional portions, content or associated information that may or may not be associated with the first portion or the first content. In certain instances, the custom summary may also include web conference content based upon input from multiple users. For example, a first user may indicate interest in a number of slides in a web conference presentation. A second user may indicate interest in a number of different slides in a web conference presentation as well as certain user comments. A third user may indicate interest in certain multimedia content associated with the web conference presentation. As such, a custom summary may include the slides of interest to the first user, the slides and user comments of interest to the second user, and the multimedia content of interest to the third user (or various other combinations of this same content).

It will be understood that, various combinations comprising the first content may be selected based upon a given first input or first portion of content. For example, different instances of first content may be selected based upon the same first input and different socially connected network relations among individuals. Similarly, various custom summaries may be determined based upon any given first content. For example, different custom summaries may be determined based upon the same first portion of content and different relations associated with a socially-connected groups.

As noted above, selecting the first content and determining the custom summary may be based upon, at least in part, a relation in a socially-connected group. Socially-connected groups may include various organizational structures, including project teams, business divisions and hierarchies, buddy lists, email and other contact lists, individuals with close geographic proximity, individuals sharing various personal or professional connections, and individuals sharing various personal or professional interests. Socially-connected groups may also include groups of individuals attending or participating in one or more web conferences as well as groups of individuals indicating interest in particular web conference content. It will be recognized that socially-connected groups may include a variety of other associations of individuals and groups of individuals not specifically described above.

Socially-connected groups may be generally characterized by relations, which may include membership in a particular socially-connected group or the number and type of connections (e.g., social, professional, interest-based) between and among members of the socially-connected group. As such, for example, a socially-connected group may include individuals within an organization that tends to work together frequently or individuals who all plan to attend a particular web conference. In this case, a relation may include membership in the group, a specific role within the group (e.g., manager, secretary, senior technologist, etc.), or other information associated with the group (e.g., length of time as a member of the group). A socially-connected group may include a subject matter expert or experts as well as individuals with various levels of interest in the subject matter. In this case, a relation may additionally include status as a subject matter expert, status as a trusted individual, or other information.

It may be desirable to select the first content or determine the custom summary based upon a relation in a socially-connected group. For example, a team leader may wish all of her team members to view several slides, a video and various comments from a web conference. The team leader may indicate through input the importance of these various types of content. The custom summary of the web conference accessible to each of the team member may then include the content indicated as important by the team leader. (This does not preclude, for example, a custom summary for an individual team member also including content selected based on input from that team member or through other means.) Similarly, a subject matter expert may indicate not only that a particular electronic slide is of interest but also that various other slides (or other information) are also of interest or are related to the particular electronic slide. Based on this input, the custom summary for members of a socially-connected group that contains relations among members that relate to the subject matter may be determined to include the content indicated by the subject matter expert. Returning also to the example of paragraph [0039], membership of the three users in a socially-connected group may result in the selected contented or the custom summary including some or all of the portions of the web conference indicated by each of the three.

As another example of selecting content based upon a relation in a socially-connected group, process 12 may be used to assemble a summary of material relevant to the audience of a presentation (or presentations) based on various indications of interest (i.e., inputs) from members of the audience. An audience (or portion of an audience) may comprise a socially-connected group and as such process 12 may be used to determine a custom summary including some or all of the content indicated as interesting by some or all of the audience members. In such case, the custom summary may collectively represent the interests of the group. Further, related socially-connected groups associated with one or more audience members (e.g., work teams or groups organized based on interest in particular subject matter) may inform selecting content (e.g., determining the custom summary) that may be relevant to one or more of the audience members.

As another example, a socially-connected group may include all participants in a conference who have indicated (e.g., through various inputs) interest in a particular portion of the web conference, for example, a particular slide or video. A custom summary may be accordingly determined to include the portion of shared interest (i.e., the particular slide or video). The custom summary may also, accordingly, include some or all of the other portions indicated as interesting by the group or members of the group. In this way, a custom summary may be determined relating to a specific portion of a web conference (i.e., the particular slide or video) and including other content based on the collective interest of some or all of the web conference audience.

It will be further understood that a socially-connected group may include one or more other socially-connected groups (or portions thereof). As such, the relations associated with the socially-connected group that includes other groups may indicate membership of a particular individual to the noted other groups. In this case, for example, a custom summary determined based upon this type of relation may include content that is relevant not only to a single socially-connected group, but also to various combinations of multiple socially-connected groups or subsets of socially-connected groups. For example, a socially-connected group comprising the audience of a web conference may include overlapping other groups including groups associated with particular subject matter interest or expertise or groups related to organizational hierarchies. As such, various custom summaries may be determined that are relevant to the entire audience, to a portion of the audience that includes a organizational group (including, e.g., content interesting to both the audience and to an administrator of the organizational group), or to a portion of the audience including both an organizational group and a group associated with particular subject matter (e.g., content interesting to the audience, to an administrator of the organizational group, and a subject matter expert).

Various other information may be valuable in determining the custom summary or the relation associated with a socially-connected group, and this information may be harvested from a variety of sources. For example, this information may be determined based upon indicators external to the web conference. An external indicator such as an email, calendar entry or invitation, second web conference, text message, or other electronic communication may indicate, for example, that particular content may be of interest to an individual, whether or not the individual (or, e.g., another individual sharing a relation in a socially-connected group) indicates interest in that content within the web conference, or even attends the web conference containing that content. For example, it may be determined from one or more emails or calendar entries that an individual is interested in subject matter N. As such, a custom summary including web conference content relating only to matter N may be determined for this individual.

External indicators may also indicate a relation in a socially-connected group. For example, emails or text messages associated with an individual or calendar invitations associated with various team meetings may indicate for an individual an membership in a group of individuals interested in particular subject matter or a organizational team focused on a particular project. Based on this relation, therefore, as indicated by the external indicators, the custom summary for this individual may include web conference content indicated to be of interest by an expert in the particular subject matter (who may or may not belong to the same socially-connected group as the individual) or content determined to be of interest to the organizational team (e.g., content including information relevant to a team project or content indicated to be of interest by a group administrator or member).

The relation in the socially-connected group may be determined in a variety of other ways as well. For example, the relation may be determined through the use of data mining, such as the mining of social network information. This may employ, for example, analysis of social network graphs (or other social network information) related to a particular organization or individual. Such analysis may incorporate analysis via artificial intelligence, machine learning, statistics and database techniques in order to determine patterns from known social or other organizational information and thereby determine various socially-connected groups along with their various contained relations.

As another example, the relation in the socially-connected group may be determined by comparing various rosters with various types of directory information. For example, an attendee list for a web conference may be compared with information contained within a corporate directory (alone or in conjunction with other information, such as, for example, indications of interest in particular content) in order to determine relevant relations among participants. For example, comparing an attendee list with a corporate directory may indicate that a portion of the attendees belong to a particular corporate research group and also, therefore, to a socially-connected group relating to a particular subject matter.

Once determined, the custom summary may be published in various ways. For example, in one embodiment, the custom summary may be automatically published (in whole or in part) in response to an input indicating the portions of the web conference which may be of interest (e.g., the first input). In other instances, the custom summary may be published in response to a later request from one or more users. In a particular embodiment, various custom summaries may be available for publication to one or more individuals through one or more interfaces (e.g., a web page or internal network link). In requesting publication of a custom summary, users may sometimes indicate a particular custom summary or may instead select a custom summary associated with an area of interest, a relation in a socially-connected group, or another individual such as a team manager, a subject matter expert or other trusted individual. For example, a user may indicate interest in ceramics and thereby receive a custom summary including content determined to be relevant to such an interest. Or a user may indicate membership in a particular organizational team and thereby receive a custom summary including content determined to be relevant to such a team. Similarly, a user may, for example, request a custom summary associated with a particular group of individuals (which may be specified particularly—e.g., a summary based on the input of Paul, Martha, and Abe—or may be determined based on relations in a socially-connected group—e.g., request a summary based on the input of same-office co-workers). A user may also request a custom summary associated with another individual. For example, a user may request a custom summary that is based on input from a manager of that individual's work group, based on input from a particular subject matter expert, or based on input from another individual.

A user may also, for example, request that a custom summary be published to other individuals. This may occur, for example, if a supervisor desires a custom summary to be published to various members of her team or socially-connected group.

A custom summary may be published when it is made available to an individual or group of individuals. A custom summary may be made available as a web link, as a downloadable file or files, through streaming delivery, or a combination of these or other means.

It will be understood from the foregoing that, in certain instances, the first portion of the web conference, the first content associated with the web conference and the custom summary of the web conference may include identical content. This may be the case, for example, if a participant in a web conference individually selects content to be provided in her own custom summary. As such, the input associated with the first portion may serve (alone or in combination with additional input) to also select the first content and determine part or all of the custom summary. Further, it will be understood that discussion contained herein concerning selection of content based upon various factors may also similarly apply to determining a custom summary, e.g., through determining content to be associated with the custom summary.

In certain other instances the first portion may differ from the first content. This may occur, for example, if a user indicates interest in a video, but, based on input from a team leader the first content (and, potentially, the custom summary) includes only a text summary of the video. Similarly, in certain other instances the first portion or first content may differ from the custom summary. These differences may relate to various aspects of process 12 including, for example, membership in a socially-connected group, various relationships among different content (e.g., subject matter similarity, authorship similarity, and other associations), and external indicators. It will be understood as well that the first content associated with the web conference may not necessarily be content included in the web conference. For example, content from a second web conference or other information source that is related by subject matter (or other criteria) to material associated with a first web conference may sometimes be included in the selected content and, as such, may also be included in certain custom summaries associated with the first web conference.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer-implemented method comprising:
    receiving, using one or more computing devices, a first input associated with a first portion of a web conference from a first computing device associated with a first user;
    receiving, using one or more computing devices, a second input associated with a second portion of the web conference from a second computing device associated with a second user;
    selecting, using one or more computing devices, a second content associated with the web conference based upon, at least in part, the second input;
    selecting, using one or more computing devices, a first content associated with the web conference based upon, at least in part, the first input; and
    determining, using one or more computing devices, a custom summary of the web conference based upon, at least in part, the selected first and second content and a relation associated with a socially-connected group, wherein the socially-connected group includes the first and second user, and wherein the relation is determined based upon, at least in part, comparing an attendee list with directory information.

2. The method of claim 1 further comprising:
    receiving, using one or more computing devices, a second input associated with a second portion of the web conference;
    selecting, using one or more computing devices, a second content associated with the web conference based upon, at least in part, the second input; and
    determining, using one or more computing devices, the custom summary of the web conference based upon, at least in part, the selected second content.

3. The method of claim 2 wherein the first input is associated with a first user and the second input is associated with a second user.

4. The method of claim 1 wherein the first content includes at least one of a presentation material, text content and multimedia content associated with the presentation material.

5. The method of claim 1 wherein the first content includes a least a segment of multimedia content, and the custom summary includes at least an electronic file associated with the segment.

6. The method of claim 1 wherein the custom summary includes at least one of the first portion of the web conference and the first content.

7. The method of claim 1 wherein the relation is determined, using one or more computing devices, based upon, at least in part, mining of social network information.

8. The method of claim 1 wherein the relation is determined, using one or more computing devices, based upon, at least in part, an external indicator.

* * * * *